US012444349B2

United States Patent

(12) United States Patent
Tang et al.

(10) Patent No.: US 12,444,349 B2
(45) Date of Patent: Oct. 14, 2025

(54) DISPLAY DEVICE

(71) Applicant: AUO Corporation, Hsinchu (TW)

(72) Inventors: Lung-Ling Tang, Hsinchu (TW); Tzu-Chiang Liao, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/919,804

(22) Filed: Oct. 18, 2024

(65) Prior Publication Data

US 2025/0246123 A1 Jul. 31, 2025

(30) Foreign Application Priority Data

Jan. 26, 2024 (TW) ................................ 113103205

(51) Int. Cl.
*G09G 3/32* (2016.01)
*G09G 3/3208* (2016.01)

(52) U.S. Cl.
CPC ............ *G09G 3/32* (2013.01); *G09G 3/3208* (2013.01); *G09G 2300/0426* (2013.01); *G09G 2300/0439* (2013.01); *G09G 2300/0452* (2013.01); *G09G 2300/0819* (2013.01); *G09G 2300/0842* (2013.01); *G09G 2310/08* (2013.01); *G09G 2330/02* (2013.01)

(58) Field of Classification Search
CPC .................. G09G 3/32; G09G 3/3208; G09G 2300/0426; G09G 2300/0439; G09G 2300/0452; G09G 2300/0819; G09G 2300/0842; G09G 2310/08; G09G 2330/02; G09G 2330/021
See application file for complete search history.

(56) References Cited

U.S. PATENT DOCUMENTS

2005/0200617 A1 9/2005 Kwak et al.
2006/0132668 A1* 6/2006 Park .................... G09G 3/3233 345/204
2006/0139257 A1 6/2006 Kwak et al.
2015/0364087 A1* 12/2015 Gu ...................... G09G 3/3233 345/78
2016/0012774 A1 1/2016 Ohara
2017/0358261 A1* 12/2017 Zhou .................... G09G 3/3258
2020/0135092 A1* 4/2020 Ahmed .................. H10D 86/40

* cited by examiner

*Primary Examiner* — William Boddie
*Assistant Examiner* — Saifeldin E Elnafia
(74) *Attorney, Agent, or Firm* — WPAT, PC

(57) ABSTRACT

A display device includes a plurality of scan lines, a plurality of data lines and a plurality of pixel modules. Each of the pixel modules includes a switching circuit and a plurality of pixel circuits. The switching circuit is electrically connected to one of the scan lines, and receives a scanning signal of the scan lines in one stage. The pixel circuits are electrically connected to the switching circuit, and receive the scanning signal. Each of the pixel circuits includes a light emitting element. One of the pixel circuits and the switching circuit is electrically connected to one of the data lines, and receives a data signal. The switching circuit is controlled by the scanning signal to turn on the pixel circuits, and writes the data signal into each of the pixel circuits in sequence when the pixel circuits are turned on.

16 Claims, 5 Drawing Sheets

110b

DISPLAY DEVICE

RELATED APPLICATIONS

This application claims priority to Taiwan Application Serial Number 113103205, filed Jan. 26, 2024, which is herein incorporated by reference.

BACKGROUND

Technical Field

The present disclosure relates to a display device. More particularly, the present disclosure relates to a display device including a switching circuit and a plurality of pixel circuits.

Description of Related Art

In order to achieve the borderless requirement, a multiplexer circuit is disposed in the conventional display device to switch between the pixel circuits, which need to be turned on, hence, a number of the wiring pad at the border of the display device can be reduced. However, additional signal controlling lines should be connected to the pixel circuits, in order to increase a number of the wires of the display device when the multiplexer circuit is disposed on the display device. When the number of the wires is increased, the wires are prone to be disconnected or overlapped with other signal lines, and the yield of the display device may be decreased.

SUMMARY

According to one aspect of the present disclosure, a display device includes a plurality of scan lines, a plurality of data lines and a plurality of pixel modules. Each of the pixel modules includes a switching circuit and a plurality of pixel circuits. The switching circuit is electrically connected to one of the scan lines, and receives a scanning signal of the scan lines in one stage via the one of the scan lines. The pixel circuits are electrically connected to the switching circuit, and receive the scanning signal. Each of the pixel circuits includes a light emitting element. One of the pixel circuits and the switching circuit is electrically connected to one of the data lines, and receives a data signal via the one of the data lines. The switching circuit is controlled by the scanning signal to turn on the pixel circuits, and writes the data signal into each of the pixel circuits in sequence when the pixel circuits are turned on.

According to one aspect of the present disclosure, a display device includes a plurality of scan lines, a plurality of data lines, a plurality of pixel modules, a scan driver and a data driver. Each of the pixel modules includes a switching circuit and a plurality of pixel circuits. The switching circuit is electrically connected to one of the scan lines, and receives a scanning signal of the scan lines in one stage via the one of the scan lines. The pixel circuits are electrically connected to the switching circuit, and receive the scanning signal. Each of the pixel circuits includes a light emitting element. The scan driver is electrically connected to the scan lines, and driving the pixel modules via the scanning signal. The data driver is electrically connected to the data lines. One of the pixel circuits and the switching circuit is electrically connected to one of the data lines, and receives a data signal via the one of the data lines. The switching circuit is controlled by the scanning signal to turn on the pixel circuits, and writes the data signal into each of the pixel circuits in sequence when the pixel circuits are turned on. A plurality of the pixel circuits are controlled by a plurality of light emitting controlling signals, respectively.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
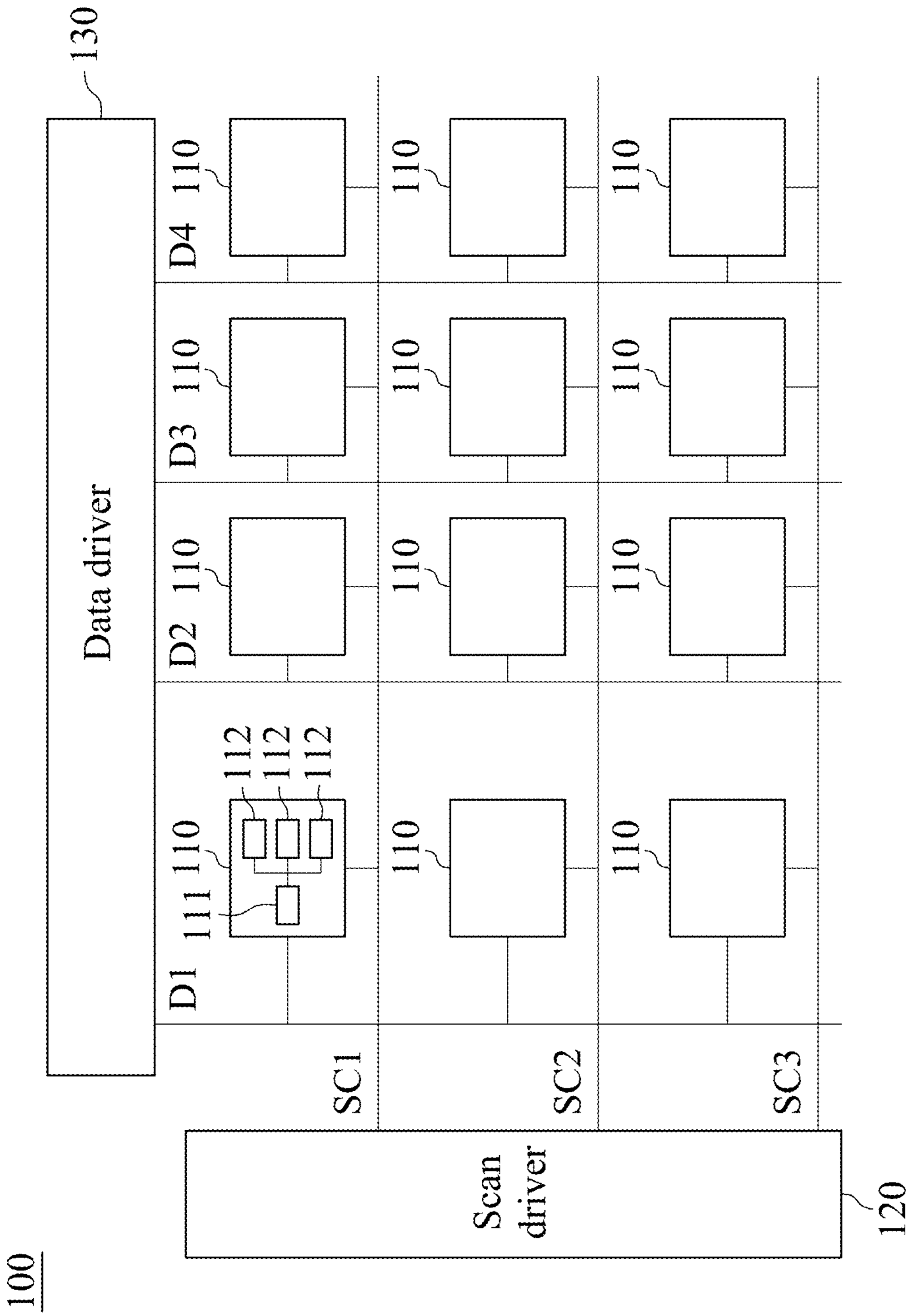
FIG. 1 shows a schematic view of a display device according to embodiments of the present disclosure.

The components and the configurations in the following description are only for illustration, and the present disclosure is not limited thereto. In order to clearly present the technical features of the present disclosure, the dimensions (such as length, width, thickness, and depth) of elements (such as layers, films, substrates, and areas) in the drawings will be enlarged in unusual proportions. Accordingly, the description and explanation of the following embodiments are not limited to the quantities, sizes and shapes of the elements presented in the drawings, but should cover the sizes, shapes, and deviations of the two due to actual manufacturing processes and/or tolerances. For example, the flat surface shown in the drawings may have rough and/or non-linear characteristics, and the acute angle shown in the drawings may be round. Therefore, the elements presented in the drawings in this case which are mainly for illustration are intended neither to accurately depict the actual shape and quantity of the elements nor to limit the scope of patent applications in this case. Moreover, the repeated reference symbols and/or labels in each of the embodiments of the present disclosure are not limited in the discussed embodiments and/or the relationships between the components.

Figure 2:
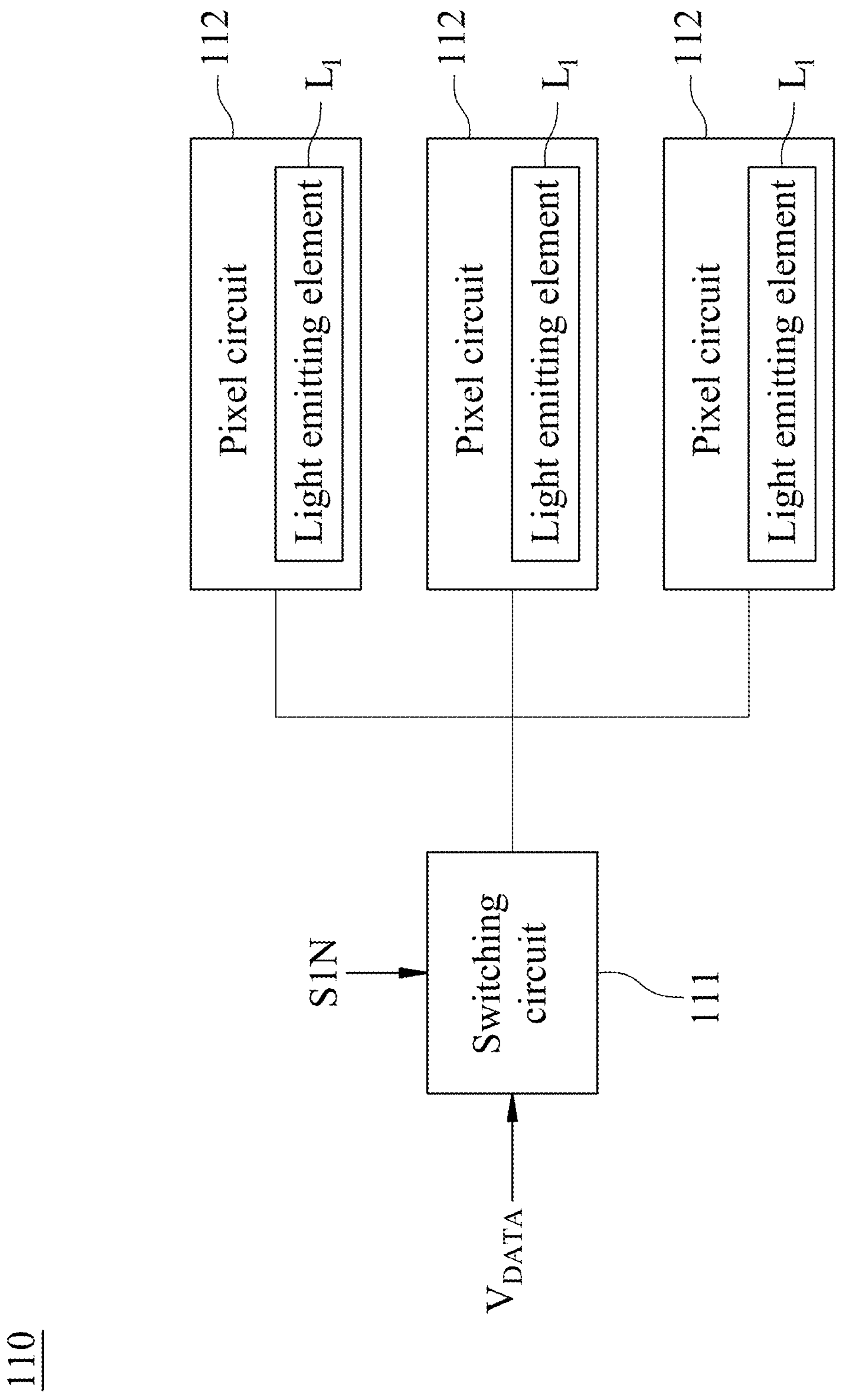
FIG. 2 shows a schematic view of one of a plurality of pixel modules of the display device of FIG. 1.

Please refer to FIG. 1 and FIG. 2. FIG. 1 shows a schematic view of a display device 100 according to embodiments of the present disclosure. FIG. 2 shows a schematic view of one of a plurality of pixel modules 110 of the display device 100 of FIG. 1. The display device 100 includes a plurality of scan lines SC1, SC2, SC3, a plurality of data lines D1, D2, D3, D4, the pixel modules 110, a scan driver 120 and a data driver 130. Each of the pixel modules 110 includes a switching circuit 111 and a plurality of pixel circuits 112. The switching circuit 111 is electrically connected to one of the scan lines SC1, SC2, SC3, and receives the scanning signal S1N of the scan lines SC1, SC2, SC3 in one stage via the one of the scan lines SC1, SC2, SC3.

The pixel circuits 112 are electrically connected to the switching circuit 111, and receive the scanning signal S1N. Each of the pixel circuits 112 includes a light emitting element $L_1$. One of the pixel circuits 112 and the switching circuit 111 is electrically connected to one the data lines D1, D2, D3, D4, and receives a data signal $V_{DATA}$ via the one of the data lines D1, D2, D3, D4. The switching circuit 111 is controlled by the scanning signal S1N to turn on the pixel circuits 112, and writes the data signal $V_{DATA}$ into each of the pixel circuits 112 in sequence when the pixel circuits 112 are turned on. A plurality of the light emitting elements $L_1$ can be arranged in array. The scan driver 120 is electrically connected to the scan lines SC1, SC2, SC3, drives the pixel modules 110 via the scanning signal S1N, and inputs the data signal $V_{DATA}$ into the pixel modules 110 via the data lines D1, D2, D3, D4. The data driver 130 is electrically connected to the data lines D1, D2, D3, D4.

All of the pixel circuits 112 of the display device 100 usually equip with repeated components, which are connected to a same signal wire. The display device 100 of the present disclosure can simplify the repeated components, which are connected to the same signal wire, of the pixel circuits 112 controlled by a same multiplexer so as to reduce a number of the repeated components, which are connected to the same signal wires, thereby, reducing a number of the wires of the data lines D1 of the display device 100 effectively, and avoiding a problem of yield reduction caused by a number of the wires too big to disconnected or overlapped with other signal lines.

The details of the structure of the pixel modules 110 of the display device 100 will be described in detail as below.

Figure 3:
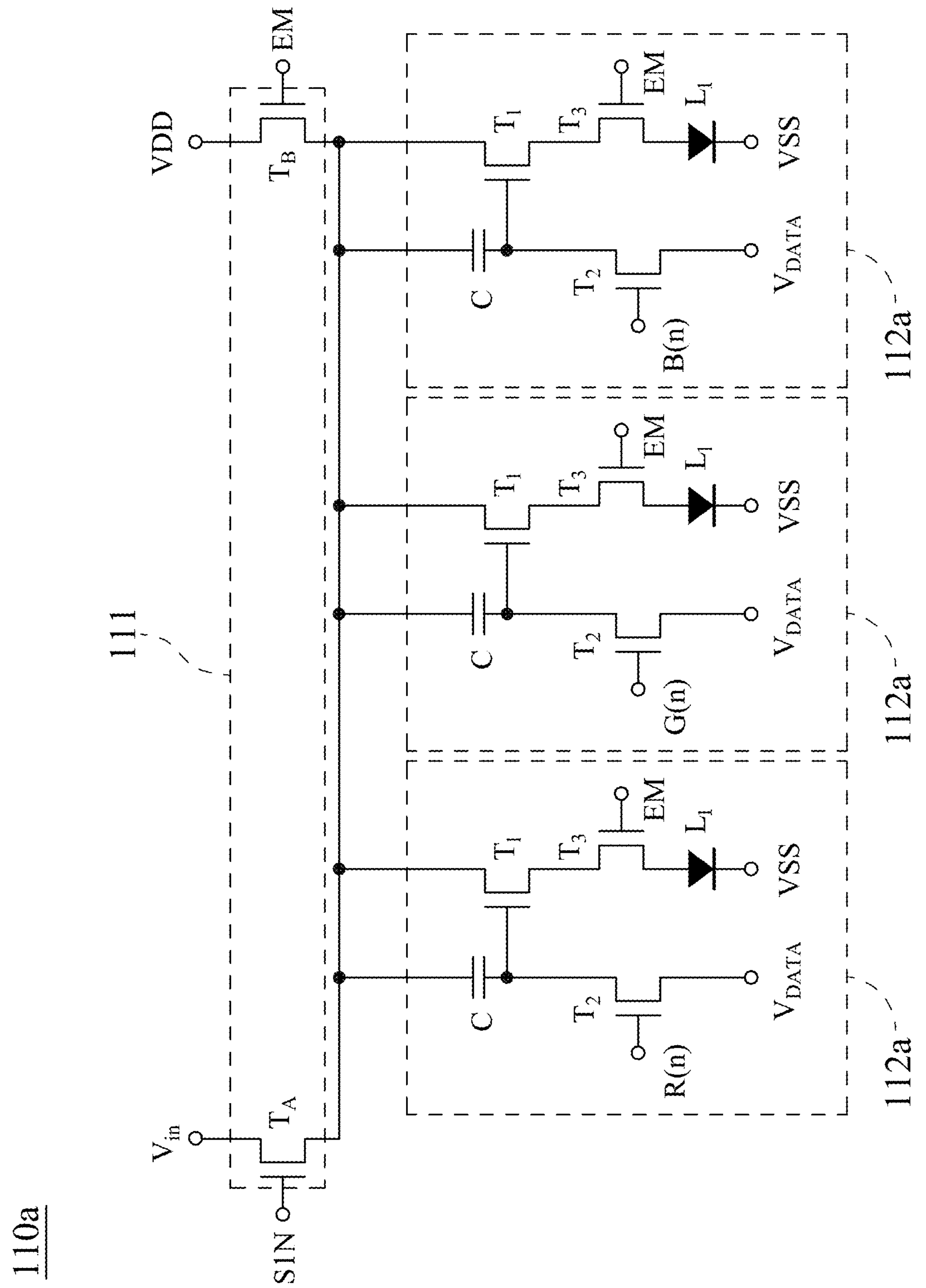
FIG. 3 shows a circuit schematic view of one of the pixel modules of the display device according to an embodiment of the present disclosure.

Please refer to FIG. 3. FIG. 3 shows a circuit schematic view of one of the pixel modules 110*a* of the display device 100 according to an embodiment of the present disclosure. A switching circuit 111 of each of the pixel modules 110*a* can include two transistors $T_A$, $T_B$. One of the two transistors $T_A$, $T_B$ (such as the transistor $T_A$) is electrically connected to the one of the scan line SC1 (shown in FIG. 1), and the other one of the two transistors $T_A$, $T_B$ (such as the transistor $T_B$) receives a light emitting controlling signal EM.

In detail, a controlling end (i.e., the gate electrode) of the transistor $T_A$ is connected to the scan line SC1, the drain electrode receives an input voltage $V_{in}$, and the source electrode is connected to the pixel circuits 112*a* and the transistor $T_B$. The gate electrode of the transistor $T_B$ receives the light emitting controlling signal EM, and the drain electrode receives a drain voltage VDD.

Each of the pixel circuits 112*a* can further include a capacitor C, a first transistor $T_1$, a second transistor $T_2$ and a third transistor $T_3$. The capacitor C is electrically connected to the switching circuit 111. The first transistor $T_1$ is electrically connected to the capacitor C and the switching circuit 111. The second transistor $T_2$ is electrically connected to the capacitor C, the first transistor $T_1$ and the data line D1 (shown in FIG. 1), and receives the data signal $V_{DATA}$ and one of the clock signals R(n), G(n), B(n). The third transistor $T_3$ is electrically connected to the first transistor $T_1$ and the light emitting element $L_1$, and receives the light emitting controlling signal EM.

Further, the capacitor C of each of the pixel circuits 112*a* is connected to the source electrode of the transistor $T_A$ and the source electrode of the transistor $T_B$. A controlling end of the transistor $T_2$ receives one of the clock signals R(n), G(n), B(n). A controlling end of the third transistor $T_3$ receives the light emitting controlling signal EM, the source electrode of the third transistor $T_3$ is connected to the light emitting element $L_1$, and the cathode of the light emitting element $L_1$ receives a source voltage VSS.

In the embodiments of the present disclosure, each of the transistors $T_A$, $T_B$, the first transistor $T_1$, the second transistor $T_2$ and the third transistor $T_3$ can be a P-type Metal Oxide Semiconductor (PMOS). When the controlling end (i.e., the gate electrode) of the transistors $T_A$, $T_B$, the first transistor $T_1$, the second transistor $T_2$ and the third transistor $T_3$ receive a high voltage level (or a voltage equivalent to the high voltage level), the transistors $T_A$, $T_B$, the first transistor $T_1$, the second transistor $T_2$ and the third transistor $T_3$ turn off. When receiving a low voltage level (or a voltage equivalent to the low voltage level), the transistors $T_A$, $T_B$, the first transistor $T_1$, the second transistor $T_2$ and the third transistor $T_3$ turn on. Each of the transistors $T_A$, $T_B$, the first transistor $T_1$, the second transistor $T_2$ and the third transistor $T_3$ can also be a N-type Metal Oxide Semiconductor (NMOS). The transistors $T_A$, $T_B$, the first transistor $T_1$, the second transistor $T_2$ and the third transistor $T_3$ turn on while the controlling end of the transistors $T_A$, $T_B$, the first transistor $T_1$, the second transistor $T_2$ and the third transistor $T_3$ receiving the high voltage level, and turn off while receiving the low voltage level. Moreover, the light emitting element $L_1$ can be a micro Light Emitting Diode (uLED) or a Mini Light Emitting Diode (Mini LED).

In the embodiment of the present disclosure, a number of the pixel circuits 112*a* of one of the pixel modules 110*a* is three, and includes a red pixel, a green pixel and a blue pixel, but the present disclosure is not limited thereto. The three pixel circuits 112*a* receive the clock signals R(n), G(n), B(n), respectively. The clock signals R(n), G(n), B(n) turn on the pixel circuits 112*a* in sequence. The scanning signal S1N turning on represents the present pixel module 110*a* is scanned, the data signal $V_{DATA}$ is corresponding to driving voltages of the light emitting elements $L_1$ of the three pixel circuits 112*a*, and the clock signals R(n), G(n), B(n) can be turned on in sequence. The light emitting controlling signal EM controls the light emitting time of the entire light emitting elements $L_1$ in the pixel modules 110*a*.

Thus, the pixel circuits 112*a* of one of the pixel modules 110*a* share one data line D1, one light emitting controlling signal EM and part of the electrical components, thereby, reducing a number of the data lines D1 of the display device 100, avoiding a problem of yield reduction caused by a number of the wires too big to disconnected or overlapped with other signal lines.

Figure 4:
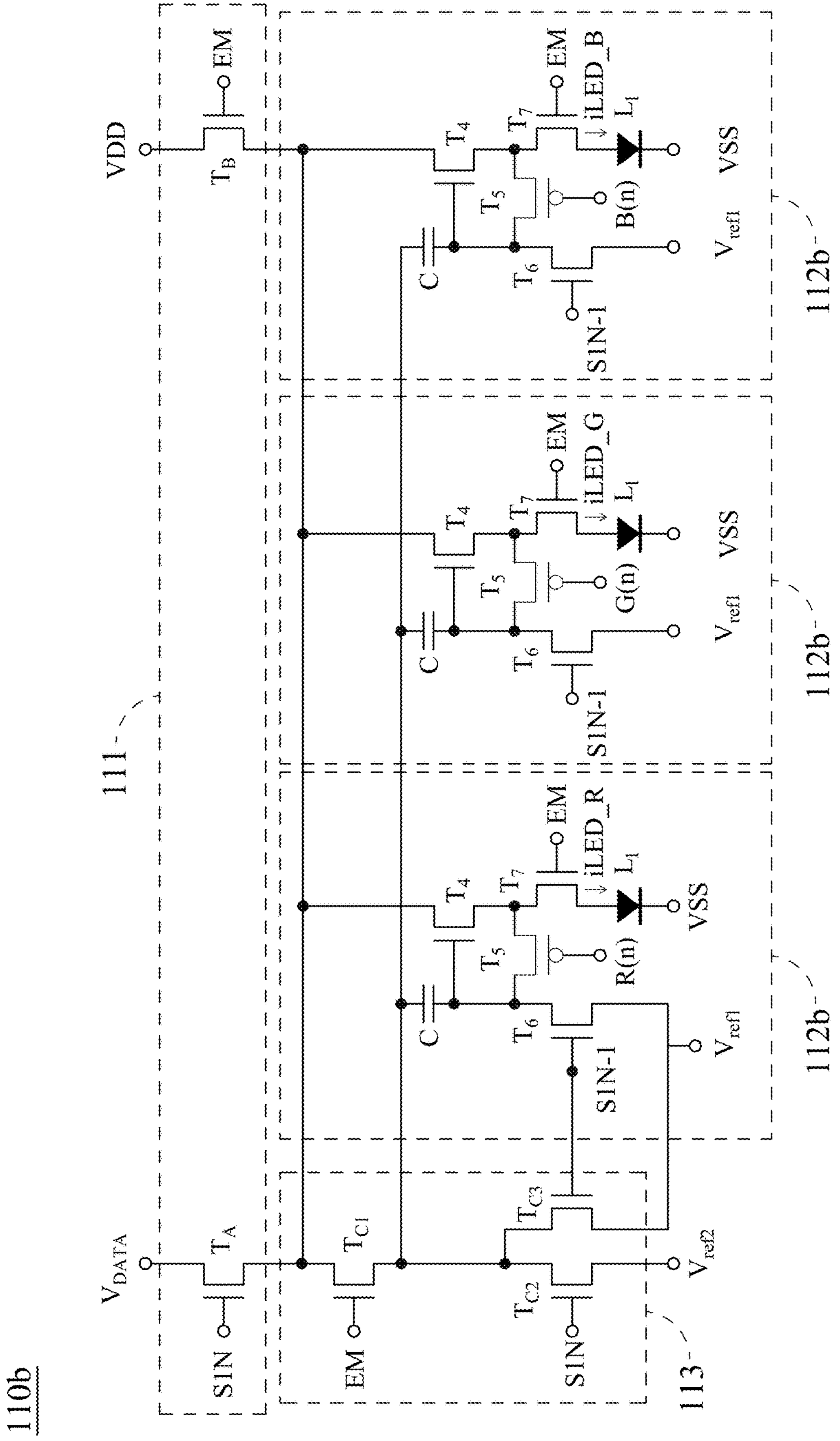
FIG. 4 shows a circuit schematic view of another of the pixel modules of the display device according to an embodiment of the present disclosure.

Please refer to FIG. 1 and FIG. 4. FIG. 4 shows a circuit schematic view of another of the pixel modules 110*b* of the display device 100 according to an embodiment of the present disclosure. The switching circuit 111 of each of the pixel modules 110*b* can include two transistors $T_A$, $T_B$. The transistor $T_A$ is electrically connected to the scan line SC1 (shown in FIG. 1). A controlling end of the transistor $T_A$ receives the scanning signal S1N, and writes the data signal $V_{DATA}$ when the scanning signal S1N is on, and the drain electrode of the transistor $T_A$ receives the data signal $V_{DATA}$. The transistor $T_B$ receives the light emitting controlling signal EM.

Each of the pixel modules 110*b* can further include a compensating circuit 113. The compensating circuit 113 is electrically connected to the switching circuit 111 and the pixel circuits 112*b*, and includes a first transistor $T_{C1}$, a second transistor $T_{C2}$ and a third transistor $T_{C3}$. The first transistor $T_{C1}$ is electrically connected to the switching circuit 111, and receives a light emitting controlling signal EM. The second transistor $T_{C2}$ is electrically connected to the first transistor $T_{C1}$, and receives the scanning signal S1N. The third transistor $T_{C3}$ is electrically connected to the first transistor $T_{C1}$ and the second transistor $T_{C2}$, and receives another scanning signal S1N-1 in a previous stage of the scan line SC1. The three pixel circuits 112*b* share the compensating circuit 113, the compensating circuit 113 can compensate the power voltage of the pixel circuits 112*b* so as to reduce a number of the total component transistors number and the number of the wire.

Each of the pixel circuits 112b can include a capacitor C, a fourth transistor $T_4$, a fifth transistor $T_5$, a sixth transistor $T_6$ and a seventh transistor $T_7$. The capacitor C is electrically connected to the first transistor $T_{C1}$ of the compensating circuit 113. The fourth transistor $T_4$ is electrically connected to the capacitor C and the switching circuit 111. The fifth transistor $T_5$ is electrically connected to the capacitor C and the fourth transistor $T_4$, and receives one of the clock signals R(n), G(n), B(n). The sixth transistor $T_6$ is electrically connected to the capacitor C and the fifth transistor $T_5$, and receives the scanning signal S1N-1. The seventh transistor $T_7$ is electrically connected to the fourth transistor $T_4$, the fifth transistor $T_5$ and the light emitting element $L_1$, and receives the light emitting controlling signal EM.

In detail, the source electrode of the second transistor $T_{C2}$ of the compensating circuit 113 receives the reference voltage $V_{ref2}$. The third transistor $T_{C3}$ is connected with the source electrode of the sixth transistor $T_6$ of the pixel circuit 112b, and receives the reference voltage $V_{ref1}$. The controlling end of the seventh transistor $T_7$ receives the light emitting controlling signal EM, the source electrode of the seventh transistor $T_7$ is connected to the anode of the light emitting element $L_1$, and the cathode of the light emitting element $L_1$ receives the source voltage VSS. The third transistor $T_{C3}$ and the sixth transistor $T_6$ are connected to a scan line SC1 in the previous stage to receive the scanning signal S1N-1 in the previous stage. Each of the first transistor $T_{C1}$, the second transistor $T_{C2}$, the third transistor $T_{C3}$ of the compensating circuit 113 and the fourth transistor $T_4$, the fifth transistor $T_5$, the sixth transistor $T_6$ and the seventh transistor $T_7$ of each of the pixel circuits 112b can be one of a PMOS and a NMOS.

Figure 5:
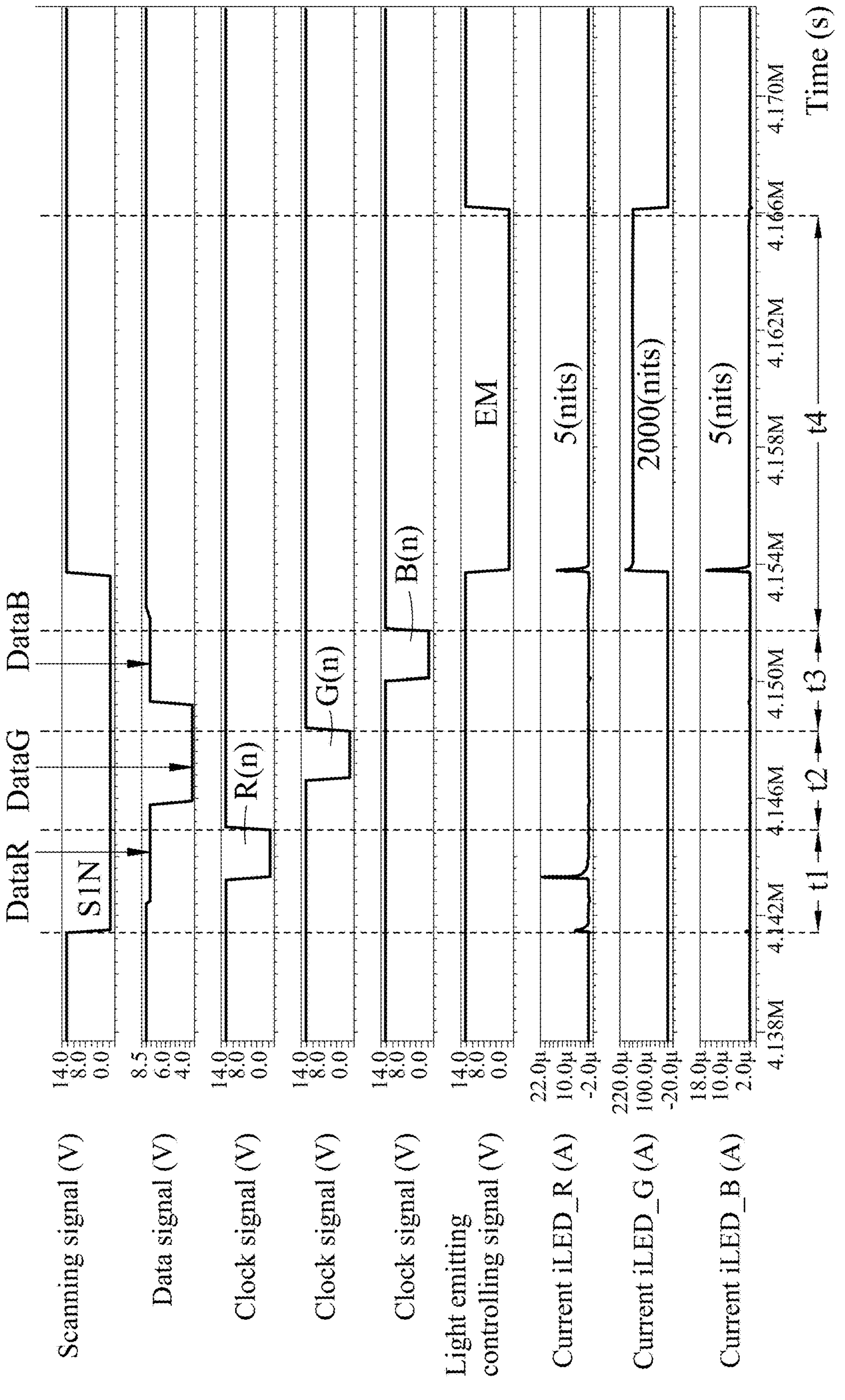
FIG. 5 shows a waveform graph of the pixel circuit of the display device.

Please refer to FIG. 4 and FIG. 5. FIG. 5 shows a waveform graph of the pixel circuit 112b of the display device 100, which shows the scanning signal S1N, the data signal $V_{DATA}$, the clock signals R(n), G(n), B(n), the light emitting controlling signal EM, the currents iLED_R, iLED_G, iLED_B flown through the light emitting elements $L_1$ of the three pixel circuits 112b in sequence. In FIG. 5, the scanning signal S1N is at a low voltage level state during the intervals t1, t2, t3.

The data signal $V_{DATA}$ generates the voltage values DataR, DataG, DataB when the scanning signal S1N is transformed into low voltage level. The voltage values DataR, DataG, DataB are corresponding to the driving voltages of the light emitting elements $L_1$ of the three pixel circuits 112b, respectively. The voltage values DataR, DataG, DataB of the data signal $V_{DATA}$ are corresponding to the pixel circuits 112b in sequence. The clock signals R(n), G(n), B(n) are turned on in sequence in the intervals t1, t2, t3, respectively, and the conduction times are corresponding to the voltage values DataR, DataG, DataB of the data signal $V_{DATA}$, respectively.

Therefore, the data signal $V_{DATA}$ can be inputted to the pixel circuits 112b in different times according to the clock signals R(n), G(n), B(n). In other words, the voltage value DataR is the driving voltage of the light emitting element $L_1$ of the pixel circuit 112b corresponding to the clock signal R(n), the voltage value DataG is the driving voltage of the light emitting element $L_1$ of the pixel circuit 112b corresponding to the clock signal G(n), the voltage value DataB is the driving voltage of the light emitting element $L_1$ of the pixel circuit 112b corresponding to the clock signal B(n). The light emitting elements $L_1$ of the three pixel circuits 112b are driven by the light emitting controlling signal EM in the interval t4.

In other embodiments of the present disclosure, the light emitting elements of the three pixel circuits can be driven by different light emitting controlling signals, but the present disclosure is not limited thereto.

According to the display device of the present disclosure, the pixel circuits of one pixel module share one data line, one light emitting controlling signal and part of the electrical components, can reduce a number of data lines of the display device, and avoid a problem of yield reduction caused by a number of the wires too big to disconnected or overlapped with other signal lines.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display device, comprising:

a plurality of scan lines;

a plurality of data lines; and a plurality of pixel modules, each of the pixel modules comprising:

a switching circuit electrically connected to one of the scan lines, and receiving a scanning signal of the scan lines in one stage via the one of the scan lines; and a plurality of pixel circuits electrically connected to the switching circuit, and receiving the scanning signal, wherein each of the pixel circuits comprises a light emitting element;

wherein one of the pixel circuits and the switching circuit is electrically connected to one of the data lines, and receives a data signal via the one of the data lines, the switching circuit is controlled by the scanning signal to turn on the pixel circuits, and writes the data signal into each of the pixel circuits in sequence when the pixel circuits are turned on;

wherein each of the pixel modules further comprises:

a compensating circuit directly connected to the switching circuit and the pixel circuits, and comprises:

a first transistor directly connected to the switching circuit, and receiving a light emitting controlling signal;

a second transistor directly connected to the first transistor, and receiving the scanning signal; and a third transistor directly connected to the first transistor and the second transistor, and receiving another scanning signal of the scan in a previous stage;

wherein each of the pixel circuits comprises:

a capacitor electrically directly connected to the first transistor;

a forth transistor directly connected to the capacitor and the switch circuit;

a fifth transistor directly connected to the capacitor and the forth transistor, and receiving a clock signal;

a six transistor directly connected to the capacitor and the fifth transistor, and receiving the another scanning signal; and a seventh transistor directly connected to the fourth transistor, the fifth transistor and the light emitting element, and receiving the light emitting controlling signal.

2. The display device of claim 1, wherein each of the pixel circuits further comprises:

a capacitor electrically connected to the switching circuit;

a first transistor electrically connected to the capacitor and the switching circuit;

a second transistor electrically connected to the capacitor, the first transistor and the one of the data lines, and receiving the data signal and a clock signal; and a third transistor electrically connected to the first transistor and the light emitting element, and receiving the light emitting controlling signal.

3. The display device of claim 2, wherein a plurality of the light emitting elements of the pixel circuits are controlled by the light emitting controlling signal.

4. The display device of claim 2, wherein each of the first transistor and the second transistor is one of a PMOS and a NMOS.

5. The display device of claim 1, wherein the switching circuit of each of the pixel modules comprises:

two transistors, wherein one of the two transistors is electrically connected to the one of the scan lines, and the other one of the two transistors receives the light emitting controlling signal.

6. The display device of claim 5, wherein each of the two transistors is one of a PMOS and a NMOS.

7. The display device of claim 5, wherein a gate electrode of the one of the two transistors is connected to the one of the scan lines, a drain electrode of the one of the two transistors receives an input voltage, and a source electrode of the one of the two transistors is connected to the pixel circuits.

8. The display device of claim 7, wherein a gate electrode of the other one of the two transistors receives the light emitting controlling signal, and a drain electrode of the other one of the two transistors receives a drain voltage.

9. The display device of claim 1, wherein the data signal generates a plurality of voltage values sequentially, and the voltage values are inputted into the pixel circuits sequentially.

10. The display device of claim 1, wherein the pixel circuits receive a plurality of clock signals, respectively, and the clock signals turn on the pixel circuits sequentially.

11. The display device of claim 10, wherein the data signal is inputted to the pixel circuits at different times according to the clock signals.

12. The display device of claim 1, wherein the light emitting element is one of a micro light emitting diode and a mini light emitting diode.

13. The display device of claim 1, wherein the switching circuit is electrically connected to the one of the data lines.

14. The display device of claim 1, wherein each of the first transistor, the second transistor, the third transistor, the fourth transistor, the fifth transistor, the sixth transistor and the seventh transistor of each of the pixel modules is one of a PMOS and a NMOS.

15. A display device, comprising:

a plurality of scan lines;

a plurality of data lines;

a plurality of pixel modules, each of the pixel modules comprising:

a switching circuit electrically connected to one of the scan lines, and receiving a scanning signal of the scan lines in one stage via the one of the scan lines;

a plurality of pixel circuits electrically connected to the switching circuit, and receiving the scanning signal, wherein each of the pixel circuits comprises a light emitting element;

a scan driver electrically connected to the scan lines, and driving the pixel modules via the scanning signal; and a data driver electrically connected to the data lines;

wherein one of the pixel circuits and the switching circuit Is electrically connected to one of the data lines, and receives a data signal via the one of the data lines, the switching circuit Is controlled by the scanning signal to turn on the pixel circuits, and writes the data signal into each of the pixel circuits in sequence when the pixel circuits are turned on;

wherein a plurality of the pixel circuits are controlled by a plurality of light emitting controlling signals, respectively;

wherein each of the pixel modules further comprises:

a compensating circuit directly connected to the switching circuit and the pixel circuits, and comprises;

a first transistor directly connected to the switching circuit, and receiving the one of the light emitting controlling signals;

a second transistor directly connected tithe first transistor, and receiving the scanning signal; and a third transistor directly connected to the first transistor and the second transistor, and receiving another scanning signal of the scan lines in a previous stage:

wherein each of the pixel circuits comprises:

a capacitor electrically directly connected to the first transistor;

a fourth transistor directly connected to the capacitor and the switching circuit;

a fifth transistor directly connected to the capacitor and the fourth transistor, and receiving a clock signal;

a sixth transistor directly connected to the capacitors and the fifth transistor, and receiving the another scanning signal; and a seventh transistor directly connected to the fourth transistor, the fifth transistor and the light emitting element, and receiving the one of the light emitting controlling signals.

16. The display device of claim 15, wherein the switching circuit of each of the pixel modules comprises:

two transistors, wherein one of the two transistors is electrically connected to the one of the scan lines, and the other one of the two transistors receives one of the light emitting controlling signals.

* * * * *